United States Patent [19]

Hill et al.

[11] Patent Number: 4,662,922
[45] Date of Patent: May 5, 1987

[54] METHOD AND APPARATUS FOR THE PRODUCTION OF GLASS FILAMENTS

[75] Inventors: Robert L. Hill, Pataskala; Douglas J. Eberle, Columbus, both of Ohio

[73] Assignee: Owens-Corning Fiberglas Corporation, Toledo, Ohio

[21] Appl. No.: 706,061

[22] Filed: Mar. 1, 1985

Related U.S. Application Data

[63] Continuation-in-part of Ser. No. 666,707, Oct. 31, 1984, abandoned.

[51] Int. Cl.$^4$ .......................................... C03B 37/085
[52] U.S. Cl. ................................................ 65/2; 65/5; 65/12
[58] Field of Search ................................ 65/1, 2, 5, 12

[56] References Cited

U.S. PATENT DOCUMENTS

| | | | |
|---|---|---|---|
| 2,335,135 | 11/1943 | Stalin | 65/5 |
| 3,021,558 | 2/1962 | Roberson | 65/16 |
| 3,150,946 | 9/1964 | Russell | 65/2 |
| 3,232,730 | 2/1966 | Drummond | 65/2 |
| 3,256,078 | 6/1966 | Drummond | 65/2 |
| 3,288,581 | 11/1966 | Schweppe | 65/2 |
| 3,334,981 | 8/1967 | Glaser | 65/2 |
| 3,518,069 | 6/1970 | Cole | 65/2 |
| 3,695,858 | 10/1972 | Russell | 65/2 |
| 3,697,241 | 10/1972 | Strickland et al. | 65/2 |
| 3,736,116 | 5/1973 | Russell | 65/2 |
| 3,829,301 | 8/1974 | Russell | 65/2 |
| 3,905,790 | 9/1975 | Strickland | 65/2 |
| 3,969,099 | 7/1976 | Reese | 65/2 |
| 4,058,385 | 11/1977 | Kleist | 65/2 |
| 4,118,210 | 10/1978 | Watanabe et al. | 65/2 |
| 4,197,103 | 4/1980 | Ishikawa et al. | 65/2 |
| 4,270,942 | 6/1981 | Coggin et al. | 65/11 W |
| 4,364,762 | 12/1982 | Sullivan et al. | 65/2 |

FOREIGN PATENT DOCUMENTS

| | | |
|---|---|---|
| 273947 | 3/1962 | Austria . |
| 712916 | 10/1941 | Fed. Rep. of Germany . |
| 746157 | 12/1943 | Fed. Rep. of Germany . |
| 1596710 | 7/1970 | Fed. Rep. of Germany . |

Primary Examiner—Robert Lindsay
Attorney, Agent, or Firm—Ronald C. Hudgens; Greg Dziegielewski

[57] ABSTRACT

A continuous glass fiber forming system incorporates a high energy stream of fluid to establish and control induced air flow from around the feeder to (1) substantially simulate the induction of air into the filament forming region in the absence of filament attenuation like that induced during attenuation and/or (2) increase the amount of heat removal effected during attenuation of the filaments.

17 Claims, 8 Drawing Figures

METHOD AND APPARATUS FOR THE PRODUCTION OF GLASS FILAMENTS

This is a continuation-in-part of U.S. patent application Ser. No. 666,707 filed Oct. 31, 1984, now abandoned.

TECHNICAL FIELD

The invention disclosed herein relates to glass filament forming systems wherein air movement into the forming zone is generated prior to filament production to substantially simulate the induced air flow into the forming zone that normally occurs during filament production to cool the forming zone and to supplement that induced air flow during filament production.

BACKGROUND

In the production of "textile" or continuous glass filaments there has been a never ending quest to increase the throughput and operating efficiency of the filament forming systems. To increase the throughput, some feeders have been designed with a greater number of orifices, while other systems have attempted to increase throughput by raising the operating temperature of the feeder and of the glass. In either case, the cooling systems must remove more heat. One of the most widely employed cooling systems consists of a plurality of blade-like members or fins that are attached to a water cooled header for removing heat from the forming zone and glass.

In the "operating" or "running" condition, the continuous filaments are mechanically drawn away from the feeder at high speed which drags or pumps the surrounding air along with the filaments which, in turn, induces air to flow into the interior of the forming zone which provides some cooling of the molten glass.

A condition known as "hanging" occurs when at least some, and usually all, of the filaments are not being drawn at production speed and molten glass continues to flow lazily from the feeder. While hanging, the induced air flow into the fiber forming zone due to the high speed advancement of the filaments is obviously not present if no filaments are being drawn. The lack of induced air flow, decreases cooling.

The forming system must be adequately cooled during "hanging" to permit the filament attenuation to be quickly restarted after disruptions in filament attenuation that frequently occur. Without adequate cooling, rapid re-start of filament production becomes exceedingly difficult, reducing the operating efficiency of the system. Historically, the cooling requirements of the filament forming system in the "hanging" condition have been a significant factor in limiting the throughput and operating temperatures of forming systems.

The present invention dramatically increases the heat removal from the forming zone during the hanging condition, as well as significantly increasing the heat removal from the forming zone during the running condition. Accordingly, utilization of the concepts of this invention will provide increased throughput and operating efficiency for a continuous filament forming system.

DISCLOSURE OF THE INVENTION

This invention pertains to a method and apparatus for producing continuous glass filaments comprising: issuing streams of molten glass from orifices in a discharge wall; drawing the streams into continuous filaments along predetermined paths; and generating movement of air from around the filament forming zone into the forming zone and in the direction of advancement of the filaments to (1) simulate the heat removal characteristics of the filament forming operations during the running condition while the filament forming system is in the hanging condition and/or (2) increase the heat removal effected in the running condition.

BEST MODE OF CARRYING OUT THE INVENTION

Figure 1:
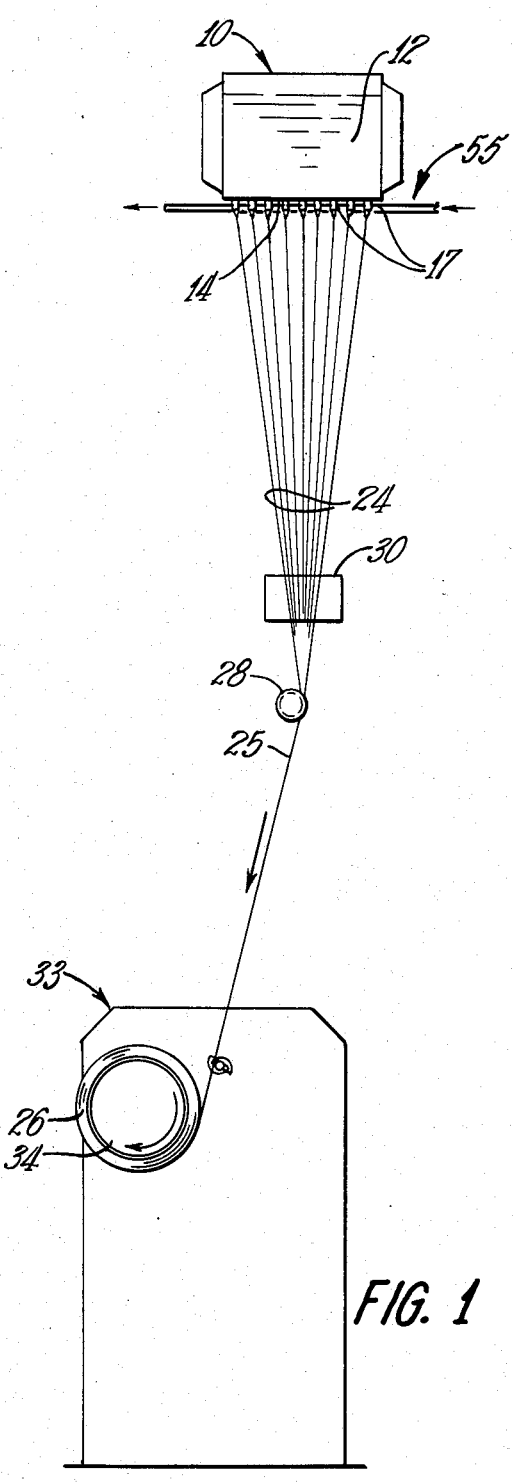
FIG. 1 is a semi-schematic front elevational view of a continuous filament forming system.

As shown in FIG. 1, feeder 10 supplies a plurality of streams of molten inorganic material, such as glass, which are mechanically attenuated into continuous filaments 24 through the action of winder 33 as is known in the art. Typically, filaments 24 are gathered into a continuous strand 25 at gathering means 28, after having received a protective coating or sizing material from coating applicator 30. Strand 25 is then wound into package 26 on the rotating collet 34 of winder 33.

Feeder 10 is comprised of a receptacle portion 12 adapted to contain the heat softened glass therein and a discharge wall or plate 14 having a plurality of orifices 20 therein adapted to permit the molten glass to issue therefrom as streams. Typically, feeder 10 is electrically energized to thermally condition the glass.

Figure 2:
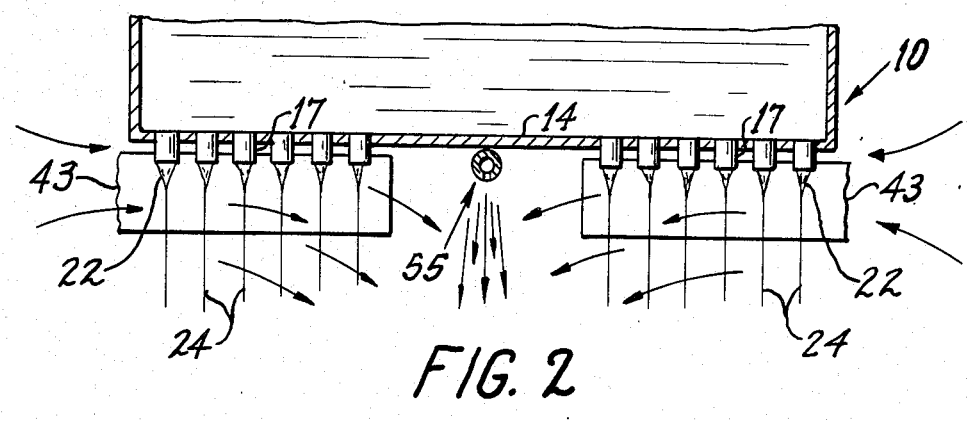
FIG. 2 is a side cross-sectional view of a portion of the filament forming system shown in FIG. 1.

FIG. 2 generally indicates the direction of air movement from outside the periphery filament forming zone, laterally along discharge wall 14 into the inner or central region of the fiber forming zone to cool the molten glass, and then downwardly along with the advancing filaments according to the principles of this invention.

Feeder 10 includes a plurality of projections or tips 17 depending from discharge wall 14, each of the projections 17 having at least one orifice 20 associated therewith for supplying molten glass for attenuation into filaments 24. As is known in the art, filaments 24 are formed from the molten glass emitted from projections 17 in the form of a cone 22 during attenuation. The region around such cones and/or tips is generally known as the filament forming zone.

Air external to the filament forming zone may be induced to flow as herein described to cool the molten glass by any suitable means. Conveniently, such induced flow is generated or established by a body of fluid flowing within or immediately adjacent the filament forming zone downwardly along the path of advancement of the filaments. Injection means 55, as shown, directs a body of high energy working fluid generally downwardly along the path of advancement of the filaments, in the direction of advancement of the filaments, to induce the air surrounding the feeder or bushing to move along the discharge wall of the feeder according to the principles of this invention. As the air from around the feeder 10 moves laterally inwardly along discharge wall 14 toward nozzle 55, this induced air flowing through the fiber forming region removes heat from the molten glass, tips and discharge wall.

The air in the forming zone around the periphery of the stream of working fluid is drawn by the working fluid much in the same manner as the air is dragged along with the advancing filaments during production. Thus, a region of reduced pressure is created around the periphery of the stream of working fluid as the air in the forming zone is pulled from the forming zone by the stream of fluid. In turn, the air around the reduced pressure region flows laterally toward the stream as it emerges from its source. The stream of working fluid should have sufficient energy to induce air to flow at a volume and velocity sufficient to appreciably cool the glass in the forming zone.

Desirably, injection means 55, which is located below wall 14, directs a small volume of gas, such as air, at high velocity away from discharge wall 14 along the path of the advancing filaments so as to not directly impinge upon the cones of glass 22 or tips 17. In doing so, the working fluid or air, during filament production, is directed so as to enhance or supplement the naturally occurring induced air flow. The working fluid emitted from injection means 55 does not have to fight or overcome the naturally occurring induced air flow but rather enhances or supplements it. This is in contrast to cooling systems wherein the working fluid is directly upwardly against discharge wall 14, counter to the advancing filaments and their natural occuring induced air flow.

An important aspect of the present invention is that the air from around feeder 10 is induced to flow laterally through the filament forming zone and then downwardly along with the advancing filaments in a manner that generally simulates the induced air flow that occurs during filament production, even though filaments are not being drawn, as would be the case in the hanging condition.

As shown in FIG. 2, a plurality of heat transfer elements or fins 43, similar to the fin-type cooling system disclosed in U.S. Pat. No. 2,908,036, are incorporated in the fiber forming system to assist in cooling the molten glass. Desirably, the instant invention is used in conjunction with such fins to remove a desired amount of heat from the filament forming zone whether or not attenuation is occurring. It is desirable that the air from around the feeder be induced to generally flow along the length of the fins 43, as opposed to flowing transversely across them, to provide for a generally uniform and smooth lateral movement of induced air through the fiber forming zone.

The ability to generate such induced air flow, when the feeder is in the hanging condition, permits the feeder to be operated at higher temperatures. This, in turn, provides an increase in glass throughput for a given feeder design. Further, the present invention also can provide increased cooling when the feeder is in the production mode by increasing the overall heat removal capability of the cooling system through enhanced induced air flow through the fiber forming zone to assist and complement the heat removal capability of cooling system components.

While the fiber forming system as shown in FIG. 2 employs a feeder 10 having a plurality of projections 17 and fin-type heat removal elements 43, it is to be understood that the present invention may be used without assistance from other types of cooling devices or without the use of such projections or tips.

Figure 3:
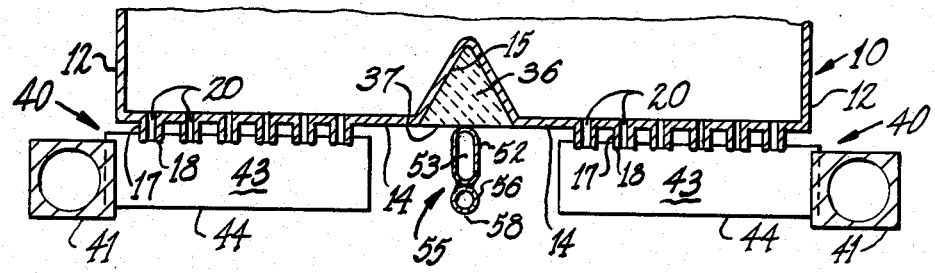
FIG. 3 is a side cross-sectional view of an alternative application of the instant invention similar to that shown in FIG. 2.
Figure 4:
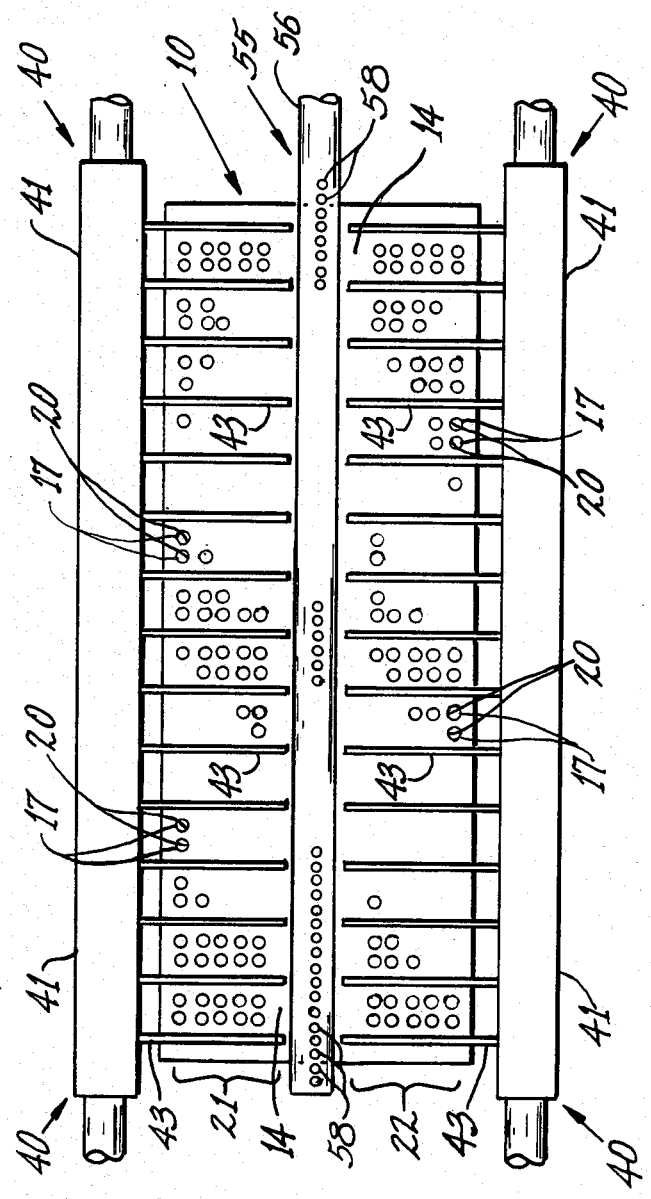
FIG. 4 is a bottom view of the fiber forming system shown in FIG. 3.

As shown in FIGS. 3 and 4, feeder 10 is comprised of a receptacle portion 12 having a discharge wall 14 including a plurality of projections 17 depending therefrom, each projection 17 having an orifice 20 therethrough for supplying a stream of molten glass. Discharge wall 14 includes a recess 15 extending along the length of feeder 10 to permit mechanical support of wall 14 as will be explained later herein.

Projections 17 are arranged in a plurality of spaced apart fields 21 and 22 which are further subdivided into generally parallel rows having heat transfer elements or fins 43 of first heat removal means 40 positioned between alternate rows of projections 17. The parallel rows of projections 17 are oriented substantially perpendicular to the lengthwise center line of discharge wall 14 along which recess 15 is located.

First heat removal means 40 is comprised of a pair of banks of heat transfer elements or fins 43 positioned in the filament forming zone and extending along the length of feeder 10. Each bank of heat transfer elements 43 is securely joined to a manifold 41 extending along the length of feeder 10. Typically, a cooling fluid, such as water, is circulated through the manifolds to conduct heat from the fins 43.

Heat is removed by convection from the forming zone by the ambient air movement generated by injection means 55. Injection means 55 is conveniently comprised of a substantially straight, hollow tubular member or nozzle 56 having a plurality of apertures 58 along the bottom thereof adapted to direct a high energy stream of fluid, such as air, along the path of advancement of the filaments to induce air from along the length of the feeder to flow inwardly through the filament forming zone and then in the direction of advancement of the filaments to cool the filament forming system according to the principles of this invention. Since injection means 55 is comprised of a substantially straight tubular member 56 having a plurality of orifices extending along the length thereof, the working fluid forms a substantially planar stream or body. A tubular member having an axial slot extending its length would provide a similar injected air flow pattern.

To provide support for discharge wall 14, support section 52 extends along the length of recess 15. Between support section 52 and recess 15 of discharge wall 14 is an insulating body of refractory material 36. Since support member 52 is cooled by circulating a cooling fluid, such as water, through passageway 53 of tubular section 52, refractory body 36 is employed for thermal as well as electrical isolation.

Support section 52, as shown in FIG. 3, is positioned intermediate refractory body 36 and member 56. For ease and stability in mounting, tubular member 56 and support section 52 are rigidly joined together by any suitable means, such as welding. As such, the apertured portion of tubular member 56 is positioned below discharge wall 14 at approximately the plane defined by the bottom edges 44 of heat transfer elements 43. Other locations of the nozzle are within the scope of the present invention as set forth below.

With regard to the hanging condition, the injection means 55 establishes and controls ambient air movement into the fiber forming zone to generally simulate the induced air flow that would otherwise occur due to the advancing filaments during filament attenuation. Thus, the feeder, tips, fin shields and other apparatus are less likely to overheat while the system is in the "hanging" condition. In addition, the transition period between the "hanging" condition and the "running" or production condition is substantially reduced since the temperatures of the various components of the fiber forming system are closer to their steady state "running" value, even though the system is in the hanging condition. Thus, the operating efficiency of the system is increased by reducing down time.

With regard to the running condition, injection means 55 directs ambient air movement into the filament forming zone to supplement the cooling effect of the induced air movement due to the action of the advancing filaments to increase the overall heat removal capacity of the cooling system, thus facilitating increase throughput and efficiency as previously explained.

The following example is included for illustrative purposes only and is not intended to limit the scope of the invention.

EXAMPLE

A conventional "tip-type" fiber forming system, similar to that illustrated in FIGS. 3 and 4, was employed in the production of continuous glass filaments from a conventional glass composition. The filaments were mechanically attenuated through the action of a winder, as is known in the art, to diameter of about 0.00092 inch.

The bushing or feeder employed in this example was constructed of a typical platinum/rhodium alloy with the orificed tips being arranged in two equal fields bisected by a single tubular member or nozzle 56 which extended along the length of the feeder. The discharge wall had the following features:

| | |
|---|---|
| Number of tips: | 4,048 |
| Orifice size: | .066 inches I.D. |
| Tip Length: | 0.130 inch |
| Discharge Wall | 18.5 in. long × 7 in. wide |
| Number of tips per row: | 22 |

The specifications of tubular section 56 of injection means 55 were as follows:

| | |
|---|---|
| Tubing size: | 0.25 inch O.D. and 0.18 inch I.D. |
| Aperture diameter: | 0.012 inch |
| Aperture spacing: | 30 apertures per inch |
| Length of apertured section: | 19.25 inches |

The apertured section of tube 56 was located approximately ½ inch below the bottom surface of discharge wall 14 and extended slightly beyond the field of orifices. Conventional fin-type heat transfer elements 43 were employed between successive pairs of rows of tips. Each "fin" was solid metal, 0.75 in. high × 0.100 in. thick × 3.625 in. long.

Figure 5:
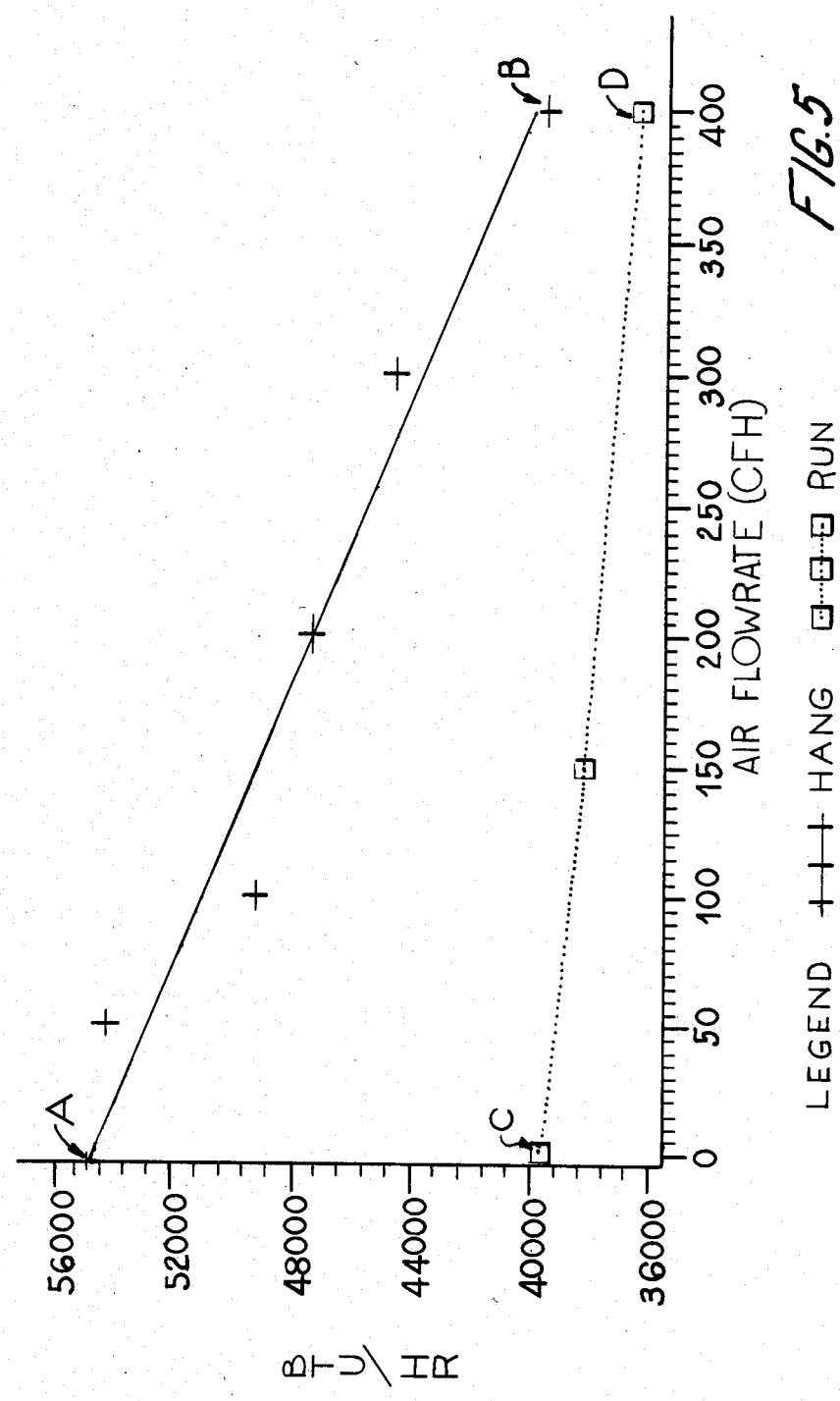
FIG. 5 is a graph showing the relationship between the heat load of a fin-type cooling system and the injected air flow rate from the fluid injection system according to the principles of the present invention for a fiber forming system of the type shown in FIGS. 3 and 4.

FIG. 5 illustrates the change in heat removed by the fin-type cooling system as the flow rate of the air flowing from injection means 55 is increased. The throughput of the feeder is held substantially constant, and the running and hanging conditions are shown.

As can be seen from line A-B in FIG. 5, the heat removed by the fins when the feeder is in the hanging condition, is dramatically decreased as the injected air flow rate is increased. Point A identifies the amount of heat removed by the fin system when there is no injected air flow, and Point B identifies the amount of heat removed by the fin shield system when air was injected at a flow rate of about 400 SCFH (standard cubic feet per hour). As such, the heat load on the fin-type cooling system was reduced about 27 percent when the injected air flow rate was approximately 400 SCFH (Point B) as opposed the heat load on the fins without the assistance of the instant invention (Point A).

Further, the amount of heat removed by the fin system during the running condition was significantly reduced as the injected air flow rate was increased as represented by line C-D in FIG. 5. Point C represents the heat removed by the fin system with no injected air flow, and D represents the heat load upon the fin system at an injected air flow rate of 400 SCFH, which reflects an 8% decrease in heat load upon the fin-type cooling system.

Since the differential between the hanging heat load and the running heat load removed by the fin system is decreased by use of the present invention, the period of transition between the hanging condition and the steady state running condition is correspondingly substantially reduced as fiberization is started and restarted. For example, the differential between points B and D is substantially less than the differential between points A and C. That is, the heat load differential between points A and C at a flow rate of zero, is about 15,000 BTU/HR (54,800−39,600) and the heat load differential between points B and D at a flow rate of 400 CFM is about 4,000 BTU/HR (40,800)−36,800) which is a 74 percent reduction ((15,200−4,000):15,200) in heat load on the fins between the running and hanging conditions. The difference in heat load on the heat transfer members between running and hanging is reduced about 20%, ((15,200−(51,000−39,000)):15,200) when comparing the differential between points A and C and the differential between running and hanging fin heat load at an injected air flow rate of 100 CFH.

Similarly, at an injected flow rate of 50 CFH, the reduction in heat load on the fins between the running and hanging conditions is about 10% ((15,200−(52,800−39,200)):15,200). Based upon the foregoing example, a mass flow insert rate of 100 CFH is approximately a mass flow rate about 0.7 CFH per square inch of discharge wall area or about 0.02 CFH per projection/orifice or stream of molten inorganic material. As the fiber forming system proceeds from the hanging condition to the desired steady-state running condition, the filaments produced during that transitional period may be of unacceptable quality. Thus, it is highly desirable to reduce the transition period for maximum operating efficiency.

Generally, as the heat load on the fin shields is reduced, the temperature of the fins is correspondingly reduced, assuming that the flow rate of the cooling fluid through the manifolds of the fin systems is maintained substantially constant.

Figure 6:
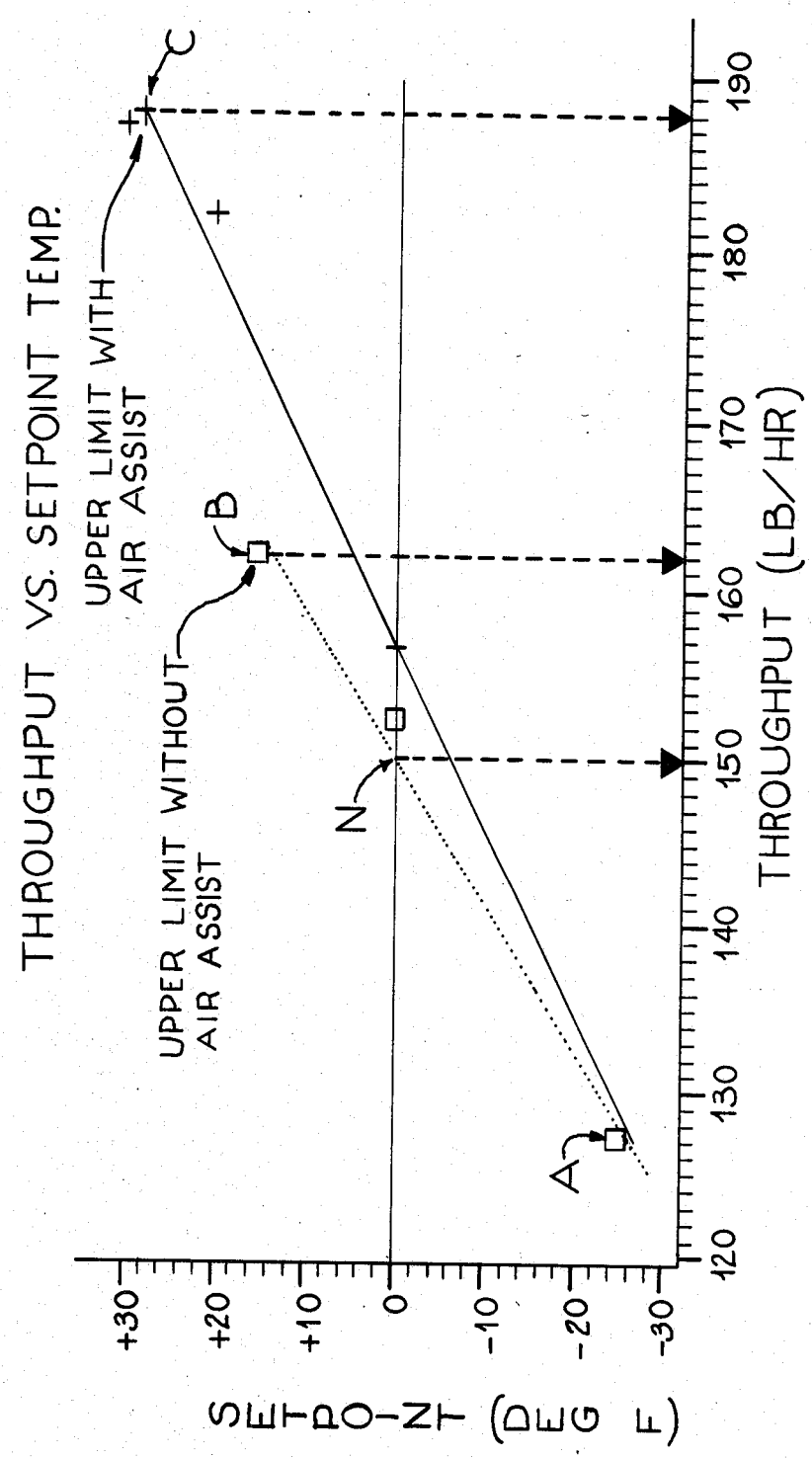
FIG. 6 is a graph showing the increase in temperature and throughput operating ranges possible when employing a cooling system according to the principles of the present invention for a fiber forming system of the type shown in FIGS. 3 and 4.

FIG. 6 illustrates that with the use of the instant invention, the throughput of a given feeder design can be dramatically increased. It is well-known in the art that such filament forming feeders are designed to operate within a temperature range around a designated set point temperature. The feeder, without the use of the injection means, exhibited an ability to operate within a range from 25° F. less than the set point to approximately 15° F. greater than the set point. These are respectively illustrated as Points A and B on FIG. 6. The demonstrated nominal throughput of the standard fiber forming system was approximately 150 pounds per hour as referenced by Point N on line A-B and, the set point temperature was about 2,214° F. as represented by the "O" point on the vertical axis of the graph of FIG. 6. The upper limit for the throughput without the injected air, Point B, was approximately 162 pounds per hour. Above that temperature, the feeder became "unhandleable". That is, the ability to restart the feeder after a disruption was significantly diminished.

With the use of the present invention, the feeder was able to operate within a range along line A-C on FIG. 6. As such, the bushing was able to operate within a range from about 25° F. less than the set point to about 30° F. higher than the set point. From the graph, it can be seen that when the feeder was operated at 30° F. (Point C) higher than the demonstrated set point, the throughput of the bushing increased to about 188 pounds per hour. Thus, the upper throughput limit for production operation of the bushing had increased by about 16 percent.

Also from FIG. 6, it can be seen that the throughput of the operation also increased about 5% ((157 LB/HR−150 LB/HR÷150 LB/HR) when comparing throughput with and without the present invention wile operating the bushing at the set-point temperature.

The air flow rate in obtaining this data was varied with Point A being generated with the supply of no injected air, from control means 55. The flow rate of the injected air may be adjusted to any suitable amount as needed for the hanging and/or running conditions. For example, the flow rate of the injected fluid may be reduced for the running condition. Further, the flow of injected air may be stopped completely, either manually or automatically, during the running condition, if desired. Preferably, however, the flow of fluid from the injection means 55 is only reduced and not eliminated.

Thus, through the use of the instant invention, the transition periods between "hanging" and "running", subsequent to a forming disruption, are reduced, and the throughput capability of the fiber forming system is greatly increased.

Any suitable combination of volume and velocity of working fluid from induced air control means 55 satisfying the cooling requirements of the fiber forming system is acceptable. The fluid being discharged from the injection means 55 should have sufficiently high energy or momentum to establish the desired induced air flow. For systems employing compressed air as the working fluid, the velocity of the air as it exits injection means 55 is desirably at least about 35 feet per second and is more desireably within the range from 35 to 350 feet per second at suitable volumes. Even more desirably, the exit velocity of the gas from injection means 55 is at least 75 feet per second and is preferably within the range from 75 to 185 feet per second, the compressed air being discharged at a rate within the range from about 100 to 400 cubic feet per hour.

The means for controlling the flow of fluid from apertures 58 may be of any suitable type such as a flow control valve and/or pressure regulator associated with the supply system for such fluid.

Figure 3A:
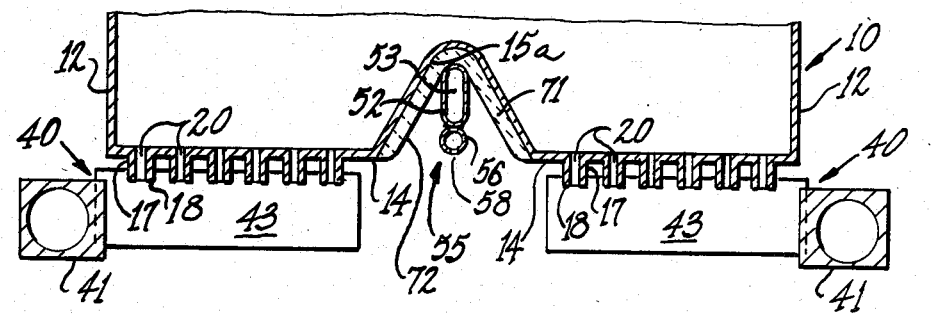
FIG. 3A is a side cross-sectional view of another embodiment of the cooling system according to the principles of this invention.

For some types of feeder designs, the proximity of the innermost orifices to injection means 55 may require that the injection means 55 be positioned above that shown in FIG. 4 to reduce or eliminate any stagnant air regions along support member 52. For example, as shown in FIG. 3A, induced air control or injection means 55 is positioned within channel 72 of refractory body 71 which is positioned within recess 15A of discharge wall 14. As such, the apertured portion of tubular member 56 is positioned above the distal end or bottom 18 of projections 17 to promote substantial induced lateral air flow to and beyond the innermost tips or orifices. As shown, the apertured portion of tubular section 56 lies generally within a plane defined by discharge wall 14.

Desirably, the exit apertures of the working fluid supply nozzle are located within a laterally extending zone defined by the plane of the bottom edges 44 of heat transfer elements 43 and the plane of bottom wall 14. However, the nozzle exit may be positioned above or below that zone, if desired.

Figure 7:
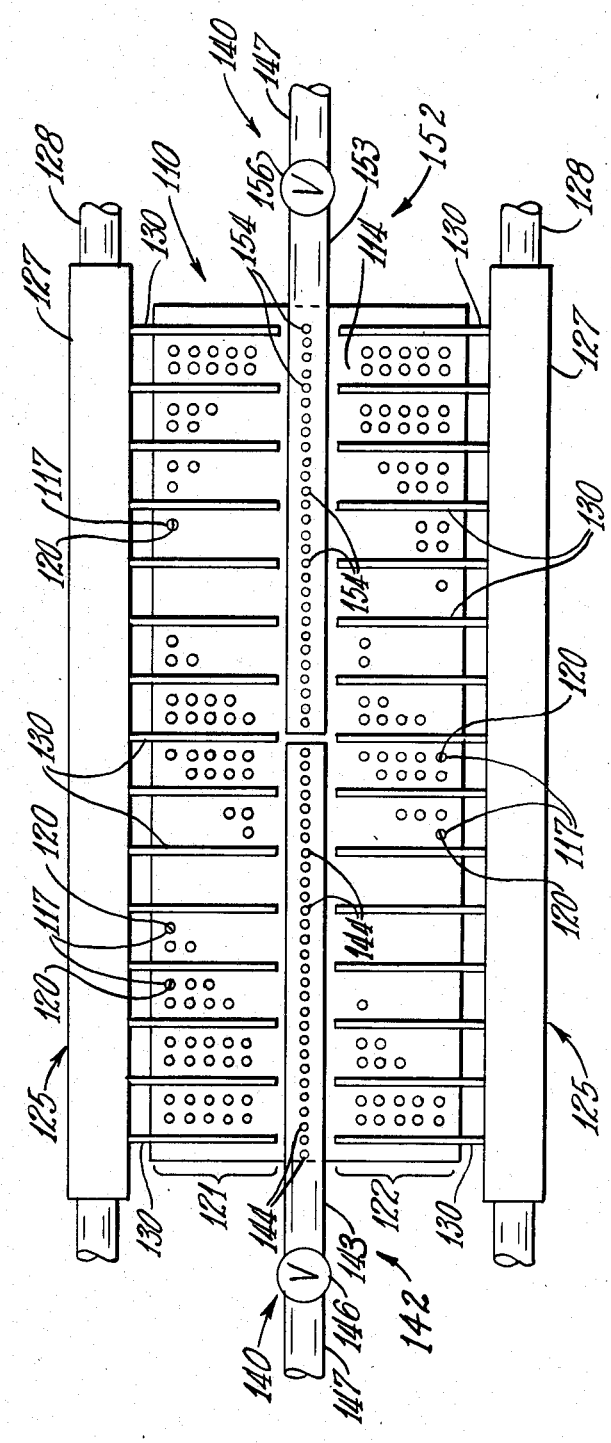
FIG. 7 is a bottom view of a filament forming system similar to FIG. 4 but showing a multi-sectioned fluid injection means.

As shown in FIG. 7, discharge wall 114 of feeder 110 includes a plurality of projections or tips 117 having an orifice 120 in each adapted to supply a stream of molten glass therethrough. Projections 117 are arranged into fields 121 and 122 which are further subdivided into pairs of rows having the heat transfer elements or fins 130 of first cooling means 125 extending there between. Similar to the previously described systems, the heat transfer elements 130 are attached to water cooled manifolds 127.

Induced air control means or injection means 140 direct a body of working fluid that lies within a plane that substantially bisects feeder 110 along the length thereof between fields 121 and 122. In this embodiment, injection means 140 is comprised of a pair of independently controlled fluid supply sections adapted to permit independent establishment of the induced air flow for separate regions of feeder 110. As shown, injection means 140 is comprised of a first supply section 142 and a second supply section 152. Of course, control means 140 may be comprised of any suitable number of independent supply sections, as desired, and not merely just two.

First fluid supply section 142 is comprised of a tube 143 having a plurality of apertures 144 along the bottom thereof adapted to supply a high velocity body of fluid to induce air to flow through the fiber forming zone according to the principles of this invention. Tube 143 is in communication with valve or control means 146 which is in communication with a suitable source of pressurized fluid via supply line 147. Similarly, second section 152 is comprised of a tube 153 having a row of apertures 154 along the bottom thereof. Tube 153 is in communication with valve or control means 156 which is connected to the source of pressurized fluid by means of supply line 147. Thus, the induced air flow of the right and left portions of feeder 110 may be substantially independently established and controlled.

Preferably, the working fluid of the injection means of the present invention is air. However, it is to be understood that other gases, including steam, as well as liquids such as water, may be employed as the working fluid issuing from the induced air control means. Further, for arrangements wherein the "injected" fluid contacts the array of filaments, the working fluid may contain or consist of a liquid sizing or binder for coating the glass filaments.

From the above-described embodiments, it will be apparent that the apparatus and methods described herein provide a means for enhancing the output and efficiency of known filament forming systems by increasing the cooling capacity thereof. The increased capacity, due to the induced air flow across the filament forming zone, is useful during hanging conditions to bring the temperature conditions of the same closer to running conditions and are also useful during running or normal conditions during which the induced air flow augments or enhances naturally induced air flow. This is accomplished, as described, by a fluid flow in the direction of the filament movement, at a minimum of expended energy.

It is apparent that, within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:

1. A method of producing continuous inorganic filaments in an operation having interruptions in filament formation comprising:
    issuing streams of molten inorganic material from a discharge wall;
    mechanically drawing the streams into continuous filaments at a filament forming zone adjacent the discharge wall, the filaments advancing along a path;
    removing heat from the filament forming zone by means of heat transfer members positioned between the streams at the forming zone; and
    during the interruptions in filament formation, supplying a stream of gas from a location between the streams of molten material at the filament forming zone directed away from the discharge wall along the path of advancement of the filaments at a volume of at least about 0.7 CFH per square inch of discharge wall and velocity of at least about 35 fps to induce ambient air to flow into the filament forming zone to simulate the induction of ambient air into the zone that is created by the advancing filaments during filament formation and thereby substantially reduce the difference in heat load on the heat transfer members between during filament formation and during interruption of filament formation.

2. A method of producing continuous inorganic filaments in an operation having interruptions in filament formation comprising:
    issuing streams of molten inorganic material from a discharge wall;
    mechanically drawing the streams into continuous filaments at a filament forming zone adjacent the discharge wall, the filaments advancing aloing a path;
    removing heat from the filament forming zone by means of heat transfer members positioned between the streams at the forming zone; and
    during the interruptions in filament formation, supplying a stream of gas from a location between the streams of molten material at the filament forming zone directed away from the discharge wall along the path of advancement of the filaments at a volume of at least about 0.02 CFH per stream of inorganic material issuing from the dfischarge wall and velocity of at least about 35 fps to induce ambient air to flow into the filament forming zone to simulate the induction of ambient air into the zone that is created by the advancing filaments during filament formation and thereby substantially reduce the difference in heat load on the heat transfer members between during filament formation and during interruption of filament formation.

3. The method of claim 1 wherein said stream of gas contains a liquid.

4. The method of claim 1 wherein the heat load difference is reduced by at least about 20%.

5. The method of claim 1 wherein the stream of gas has a velocity of at least about 75 feet per second.

6. The method of claim 5 wherein the stream of gas has a velocity within the range from about 35 to 350 feet per second.

7. The method of claim 1 wherein the stream of gas has a flow rate of at least from 100 cubic feet per hour.

8. The method of claim 1 further comprising flowing said stream of gas during filament formation at a volume and velocity sufficient to induce additional ambient air to flow into the filament forming zone to supplement the ambient air induced to flow therein by the advancing filaments.

9. The method of claim 1 further comprising flowing said stream of gas during filament formation at a volume and velocity sufficient to substantially reduce the heat load on the heat transfer members.

10. The method of claim 2 further comprising flowing said stream of gas during filament formation at a volume and velocity sufficient to substantially increase the effective filament forming throughput of the operation.

11. The method of claim 1 wherein the inorganic material is glass and the stream of gas is air.

12. The method of claim 8 wherein the ambient air is induced to move laterally along the discharge wall into the central region of the filament forming zone and then downwardly along the path of advancement.

13. The method of claim 1 wherein the stream of gas is in or above a plane generally defined by the bottom of the heat transfer members.

14. The method of claim 10 wherein the throughput is increased at least about 5%.

15. Apparatus for producing continuous filaments from streams of molten inorganic material comprising:
    feeder means having a discharge wall having orifices adapted to define the streams, said orifices being arranged in rows in a plurality of fields;
    attenuation means for mechanically drawing the molten streams into continuous filaments, the filaments advancing along a path;
    banks of blade-like heat transfer members located adjacent the discharge wall and extending between the rows of orifices adapted to remove heat from the molten streams;

a support member adapted to support the discharge wall, the support member being positioned between the discharge wall and an after-defined tubular member; and a tubular member positioned between the fields of orifices and banks of heat transfer members and extending along the length of the discharge wall adapted to supply a planar stream of gas oriented substantially perpendicular to the length of the heat transfer members, the planar stream of gas being directed away from the discharge wall along the path of advancement of the filaments at a volume and velocity sufficient to induce ambient air around the feeder to flow along the discharge wall toward the injection means to (1) during interruptions in filament formation, simulate the flow of ambient air created by advancing filaments during production and/or (2) to increase the flow of ambient air between the streams and heat transfer members to supplement the ambient air flow created by the advancing filaments, the tubular member extending along and being fastened to the support member.

16. The apparatus of claim 15 wherein the injection means is comprised of at least two independently controllable sections to provide independent control over portions of the stream of gas.

17. The apparatus of claim 15 wherein said injection means is adapted to supply said stream of gas from a location in or above a a plane defined by the bottoms of the blade-like fins.

* * * * *